United States Patent [19]
Furford

[11] Patent Number: 5,881,544
[45] Date of Patent: Mar. 16, 1999

[54] CRANBERRY HARVESTING MACHINE

[76] Inventor: Julius M. Furford, Rte. 1, Box 111, Grayland, Wash. 98547

[21] Appl. No.: 741,805

[22] Filed: Oct. 31, 1996

[51] Int. Cl.[6] .................................................. A01D 46/00
[52] U.S. Cl. .............................................................. 56/330
[58] Field of Search .......................... 56/330, 331, 12.4, 56/327.1, 328.1; 74/531, 533

[56] References Cited

U.S. PATENT DOCUMENTS

| | | | |
|---|---|---|---|
| 146,579 | 1/1874 | DeGray | 56/330 |
| 558,990 | 4/1896 | Secord | 74/533 |
| 781,956 | 2/1905 | Kinney | 74/533 X |
| 924,552 | 6/1909 | Holmes | 56/300 |
| 1,717,931 | 6/1929 | MacGregor | 56/14.8 X |
| 2,312,984 | 3/1943 | Underhill | 56/14.8 X |
| 2,430,734 | 11/1947 | Raney et al. | 56/12.4 X |
| 2,780,905 | 2/1957 | Darlington | 56/330 |
| 2,915,871 | 12/1959 | Furford | 56/330 |
| 3,623,309 | 11/1971 | Stang et al. | 56/330 |
| 3,672,140 | 6/1972 | Furford . | |
| 3,704,576 | 12/1972 | Quick | 56/330 |
| 3,742,685 | 7/1973 | Lian et al. | 56/11.4 X |
| 3,964,245 | 6/1976 | Hecht | 56/331 |
| 4,519,191 | 5/1985 | Ledebuhr et al. | 56/330 X |
| 5,369,944 | 12/1994 | Robichaud | 56/330 |
| 5,499,493 | 3/1996 | Rosset | 56/330 X |

*Primary Examiner*—Anthony Knight
*Assistant Examiner*—Gary Grafel
*Attorney, Agent, or Firm*—Christensen O'Connor Johnson & Kindness, PLLC

[57] ABSTRACT

A cranberry harvesting machine (20) including a main frame (22) supported by a wheel assembly (24) is provided. A harvesting assembly (26) is attached to the forward end of the main frame (22). A motor (M) is supported by the main frame (22) and includes a rotational output via a drive wheel (30). The drive wheel (30) drives both the harvesting assembly (26) and the wheel assembly (24). To accomplish this, a separate drive assembly (32) is interconnected between the drive wheel (30) and the wheel assembly (24) in order to operate the wheel assembly (24) independently of the harvesting assembly (26). The separate drive assembly (32) includes a transmission (34) having multiple operative modes and variable rotational output speeds.

19 Claims, 7 Drawing Sheets

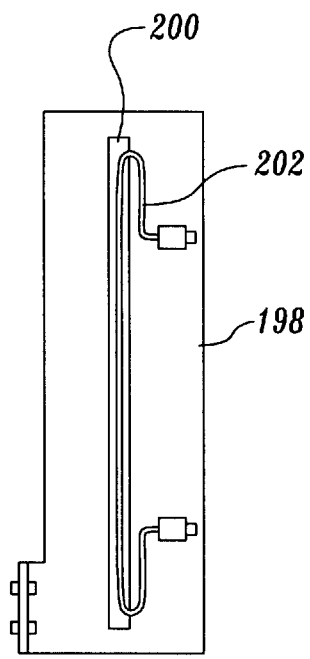
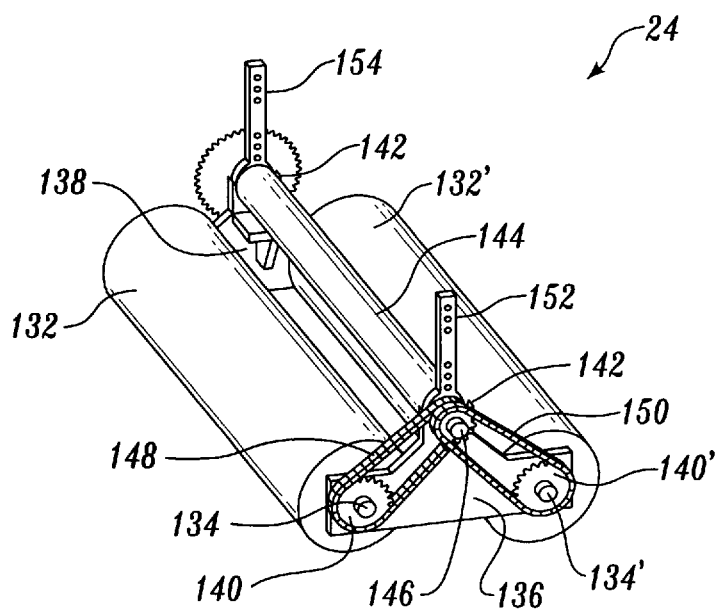

CRANBERRY HARVESTING MACHINE

FIELD OF THE INVENTION

The present invention relates to cranberry harvesting machines, and in particular, a self-propelled motorized vehicle for use in cranberry picking and pruning.

BACKGROUND OF THE INVENTION

Cranberries are grown in bogs having relatively flat bottom surfaces that are surrounded by dikes. During harvesting, these bogs may be flooded with water to facilitate picking or they may be kept relatively dry for certain types of harvesting operations. The cranberry vines are rooted in the bottom of the bog and form a tangle of vines reaching approximately one foot high. The cranberries themselves are attached to the ends of tips or tendrils that extend from the base of the vines roughly every six to eight inches.

A conventional technique for harvesting the cranberries is to push a harvesting machine over the vines. The machine lifts the vines that are near the bottom of the bog and cuts them to allow new growth to form. Simultaneously, the machine separates the cranberries while leaving the tips intact. It is conventional for the machine to include conveying means that convey the cranberries to sacks or boxes located alongside the machine.

Conventional harvesting machines suffer from a number of disadvantages. First, it is difficult to maneuver these devices around corners and edges of the bog, and especially when wanting to reverse the machine's motion of travel. Currently, an operator must shift the drive motor to neutral, disengage the machine's wheels, and back the machine up and turn it to the opposite direction. A second problem is in that the pruning knives are often powered by the same systems used to propel the machine through the bogs. Typically, the motor drives the machine wheels, and from the same linkage, drives the pruning knives as well. Although it is desirable to operate the knives only while the machine is moving forward, there are times when it would be helpful to be able to keep the pruning knives operating at a constant speed while having the capability to speed up or slow down the machine's translational speed. Thus, a need exists for an improved cranberry harvesting device that avoids the above-described problems.

SUMMARY OF THE INVENTION

In accordance with the present invention, a cranberry harvesting machine a main frame supported by a wheel assembly is provided. A harvesting assembly is attached to the forward end of the main frame. A motor is supported by the main frame and includes a rotational output via a drive wheel. The drive wheel drives both the harvesting assembly and the wheel assembly. To accomplish this, a separate drive assembly is interconnected between the drive wheel and the wheel assembly in order to operate the wheel assembly independently of the harvesting assembly. The separate drive assembly includes a transmission having multiple operative modes and variable rotational output speeds. This allows the wheel assembly to be operated independently from the harvesting assembly.

In accordance with aspects of this invention, the drive assembly includes a jack shaft rotatably engaged between the drive wheel and the transmission. The jack shaft provides the rotary input to the transmission. The transmission produces a rotary output that is directed to drive the wheel assembly. The preferred transmission is a hydrostatic transmission. The drive assembly further includes a shifting lever that connects at one end to the transmission. The other end of the shifting lever extends through a slot in a control panel that is attached to the main frame. The control panel preferably includes an elongated compression spring for urging the level to a particular location along the slot.

In accordance with aspects of this invention, the wheel assembly includes a pair of similarly-sized carriage rolls located on the underside of the main frame near the apparatus center of gravity. The carriage rolls are oriented in a generally lateral plane. The wheel assembly further includes at least one gear set engaged between the carriage rolls and the transmission rotational output. The gear set advantageously multiplies the available torque.

In accordance with aspects of this invention, the harvesting assembly includes a head having a number of spaced-apart teeth extending forwardly from an upwardly inclined rear portion. A feed bar having a plurality of rotatable picks is mounted laterally on a pick shaft. The picks are positioned near the spaces between the teeth. The harvesting assembly further includes a gauge wheel attached to the main frame forward end for altering the elevation of the other harvesting assembly components relative to the ground.

In accordance with aspects of this invention, a sacking system including a container located at and supported by the main frame is provided. A conveyor extends between the harvesting assembly and the container in order to move harvested material to the container.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a plan view of the under side of a control panel formed in accordance with the present invention;

FIG. 5 is a side perspective view of a wheel assembly formed in accordance with the present invention;

DETAILED DESCRIPTION OF THE PREFERRED EMBODIMENT

Figure 1:
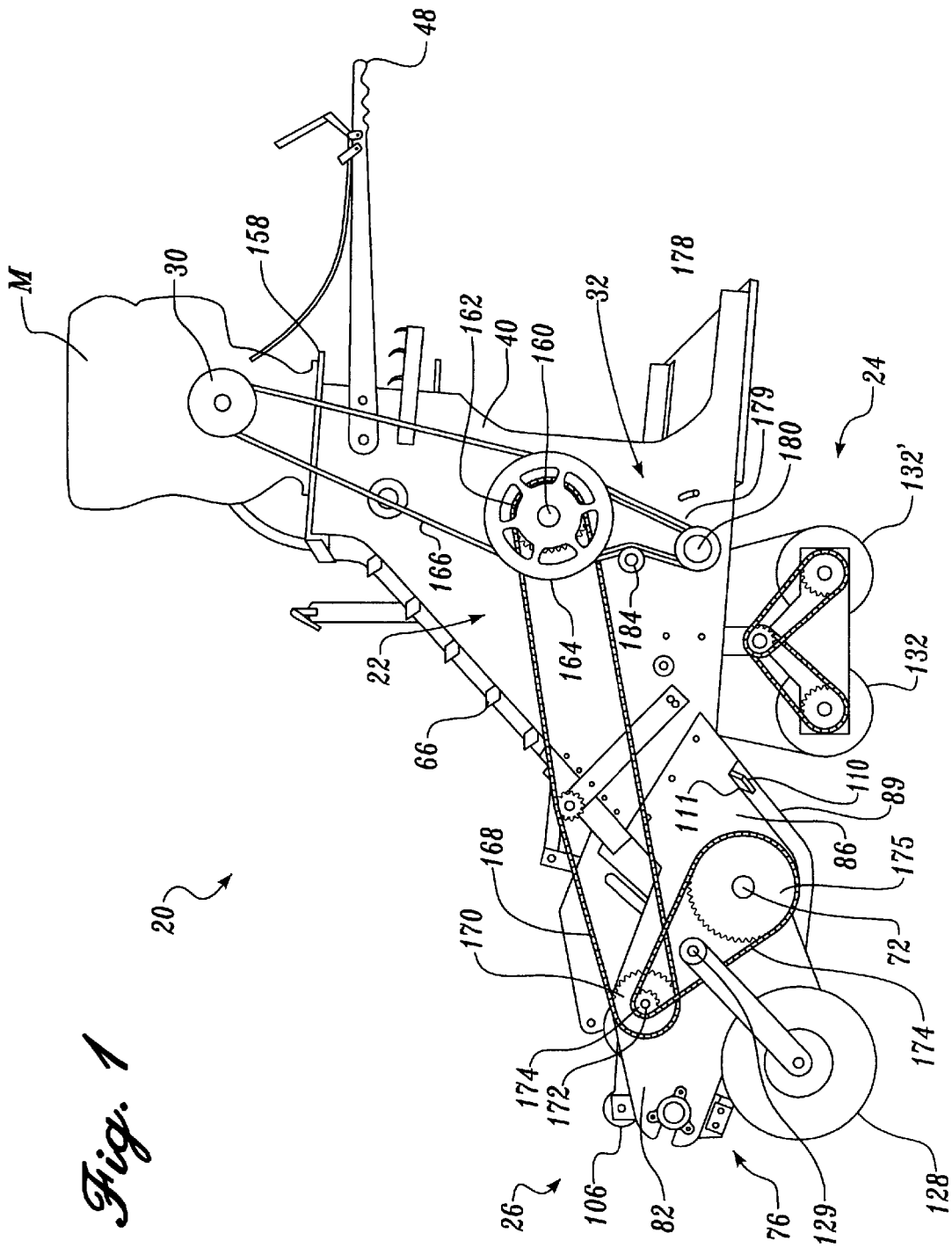
FIG. 1 is a left side perspective view of a cranberry harvesting machine formed in accordance with the present invention.
Figure 2:
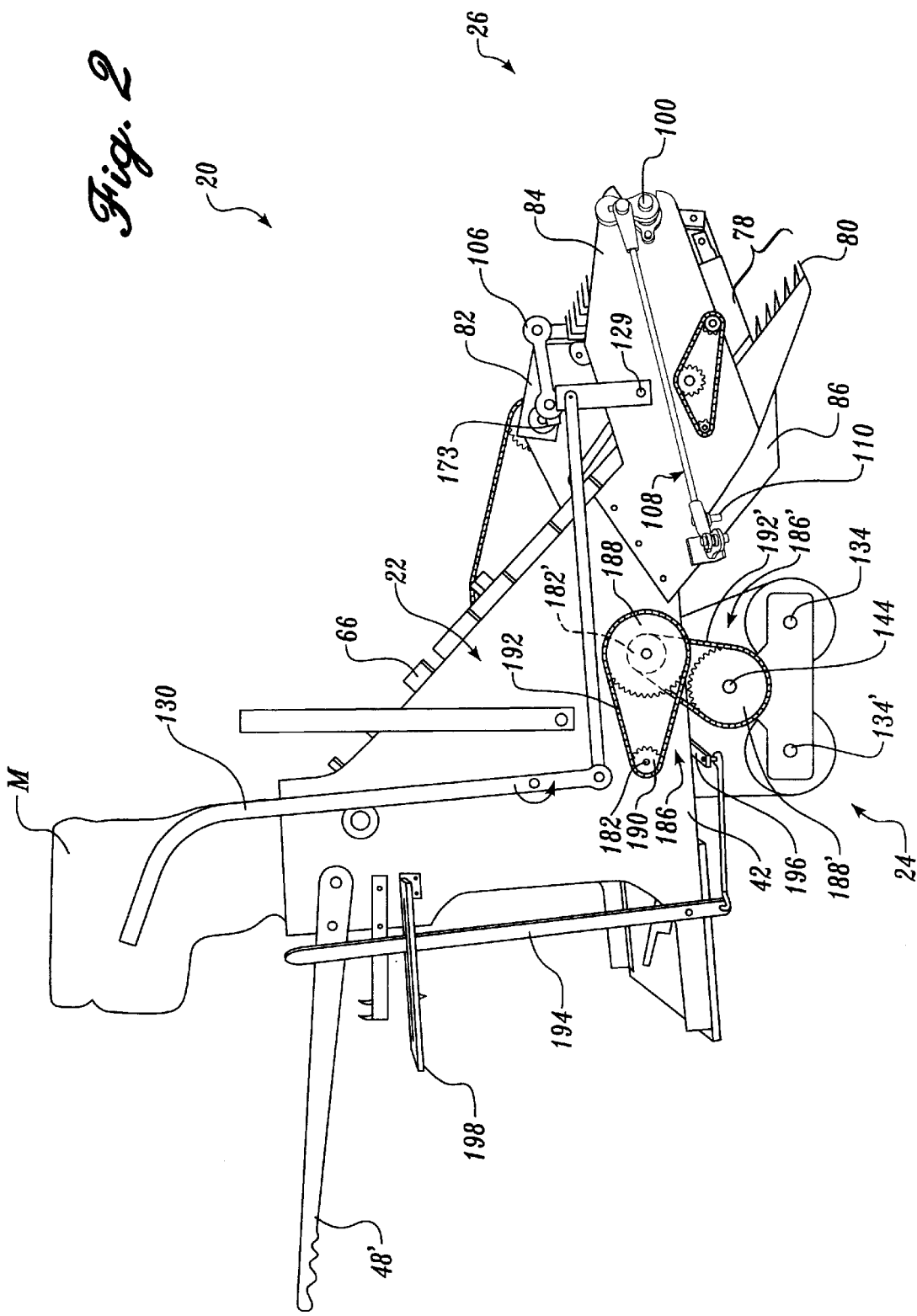
FIG. 2 is a right side perspective view of the cranberry harvesting machine of FIG. 1.

Referring to FIGS. 1 and 2, in general, a cranberry harvesting machine 20 formed in accordance with the present invention includes a main frame 22 supported by a wheel assembly 24. A harvesting assembly 26 is attached to the forward end of the main frame. A motor M is supported by the main frame 22 and includes a rotational output via a drive wheel 30. The drive wheel 30 drives both the harvesting assembly 26 and drives the wheel assembly 24. To accomplish this, a separate translational drive assembly 32 is interconnected between the drive wheel 30 and the wheel assembly 24 in order to operate the wheel assembly independently of the harvesting assembly 26. The drive assembly 32 (shown in FIGS. 1 and 3) includes a transmission 34 having multiple operative modes and variable rotational output speeds.

Figure 3:
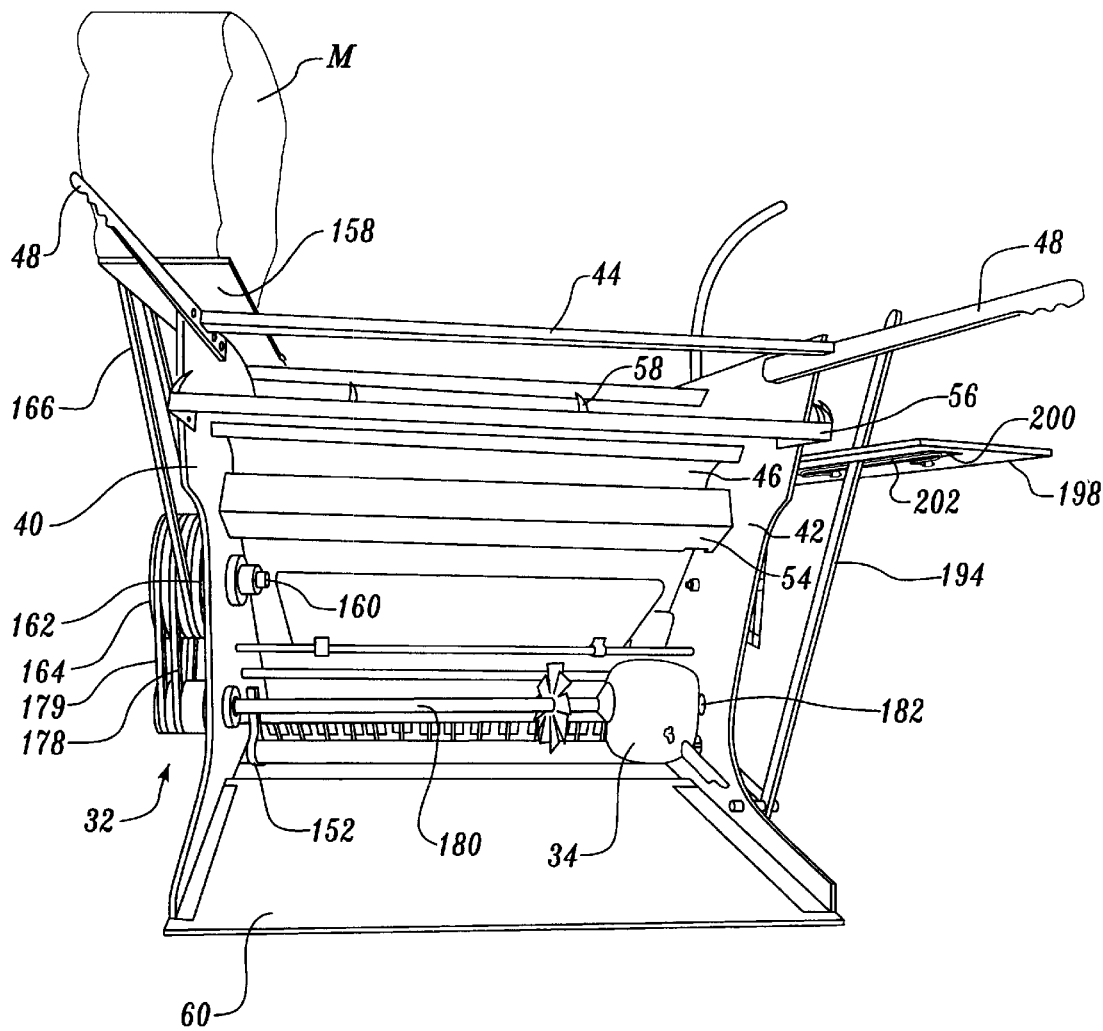
FIG. 3 is a rear perspective view of the rear end of the cranberry harvesting machine of FIG. 1.

In more detail, the main frame 22 is formed from rigid interconnecting members, such as stainless steel plates and beams. Referring to FIG. 3, the main frame includes left and right upright side plates 40, 42 held in spaced-apart relation by transverse beams 44. The preferred planform shape of the side plates 40, 42 is roughly a 45°-45°-90° triangular. The hypotenuse faces forward and upward. A flat panel 46 extends between the left and right side plates 40, 42 for roughly the entire hypotenuse distance. See FIGS. 3 and 8. The main frame 22 preferably includes a pair of handle bars 48, 48', one extending rearward from the aft edge of each side plate. During use, an operator stands behind the machine and grips the handle bars 48, 48' to control the machine's direction of travel.

Figure 8:
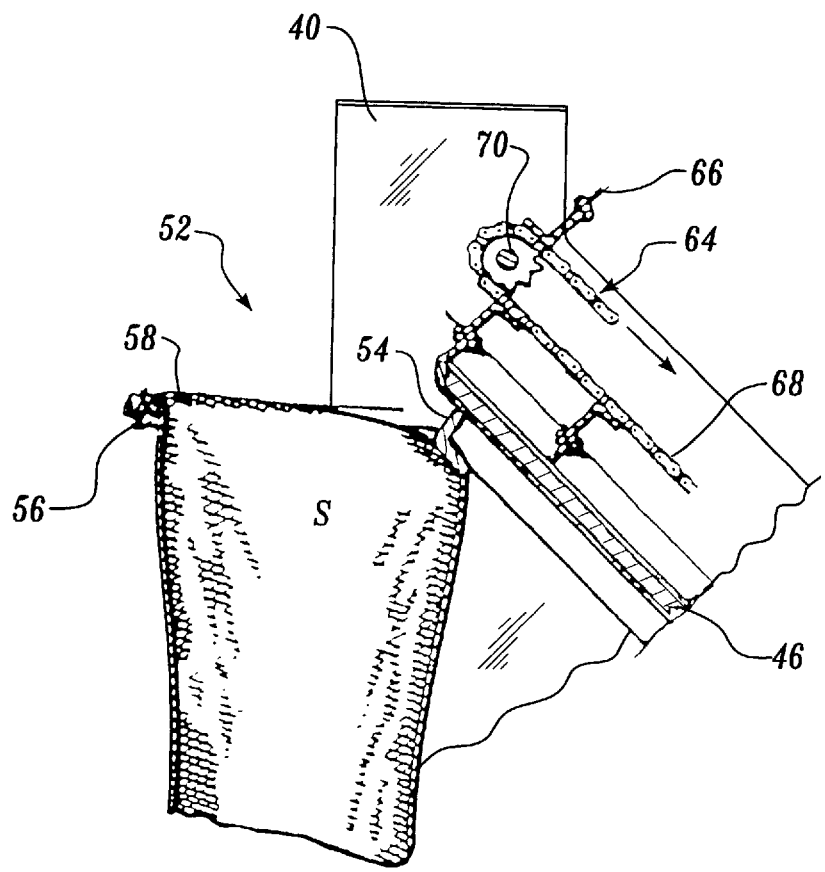
FIG. 8 is a side view of portions of a sacking system formed in accordance with present invention.

Still referring to FIGS. 3 and 8, also mounted on the main frame 22 is a sacking system 52 including an inverted hooking plate 54 and a sack hanger 56. The inverted hooking plate 54 is located transversely between the side plates 40, 42 at the upper aft region of the main frame. The sack hanger 56 has a horizontally-oriented U-shape. One end of the sack hanger is attached to the left side plate 40, the other to the right side plate 42. The remaining portions of the sack hanger extend aftward away from the main frame 22. Both end attachments are located at the same approximate height along the main frame aft edge at the inverted hooking plate 54. Small protrusions 58 extend upward from the sack hanger 56. Below the sack hanger 56, a sack support shelf 60 spans horizontally outward from the main frame 22. During use, a sack S or more generally a container, is placed on the shelf. About half of the opening edge of the sack S is hooked under the inverted hooking plate 54 and the other half of the opening edge is laid over the sack hanger 56. The protrusions 58 become embedded in the sack as the weight of the cranberries urges the sack downward.

Referring to FIG. 8, the sacking system 52 further includes a conveyor 64 positioned directly adjacent to the main frame upwardly sloping flat panel 46. As shown, the conveyor 64 extends generally between the harvesting assembly 26 and the container. The conveyor 64 includes a number of resilient flaps 66 that extend between endless elevator chains 68 located at each side plate 40, 42. The elevator chains 68 are looped about upper and lower conveyor shafts 70, 72 (indicated in FIGS. 1 and 8) that extend normally between the side plates 40, 42. The drive for the conveyor shafts 70, 72 is described below with regard to the motor M. The chain 64 parallels the hypotenuse forward edge of the main frame side plates 40, 42. The flaps 66 are oriented substantially normal to the plane of the flat panel 46. As the berries are harvested, as described below, they are urged onto the flat panel 46 where the flaps 66 wipe the cranberries upward. The flaps 66 are made of a flexible material such as neoprene. Where the flaps 66 reach the upper shaft 70, the flat panel 46 meets the inverted hooking plate 54. Therefore, during use the cranberries fall off the flap panel and into the sack S.

Figure 6:
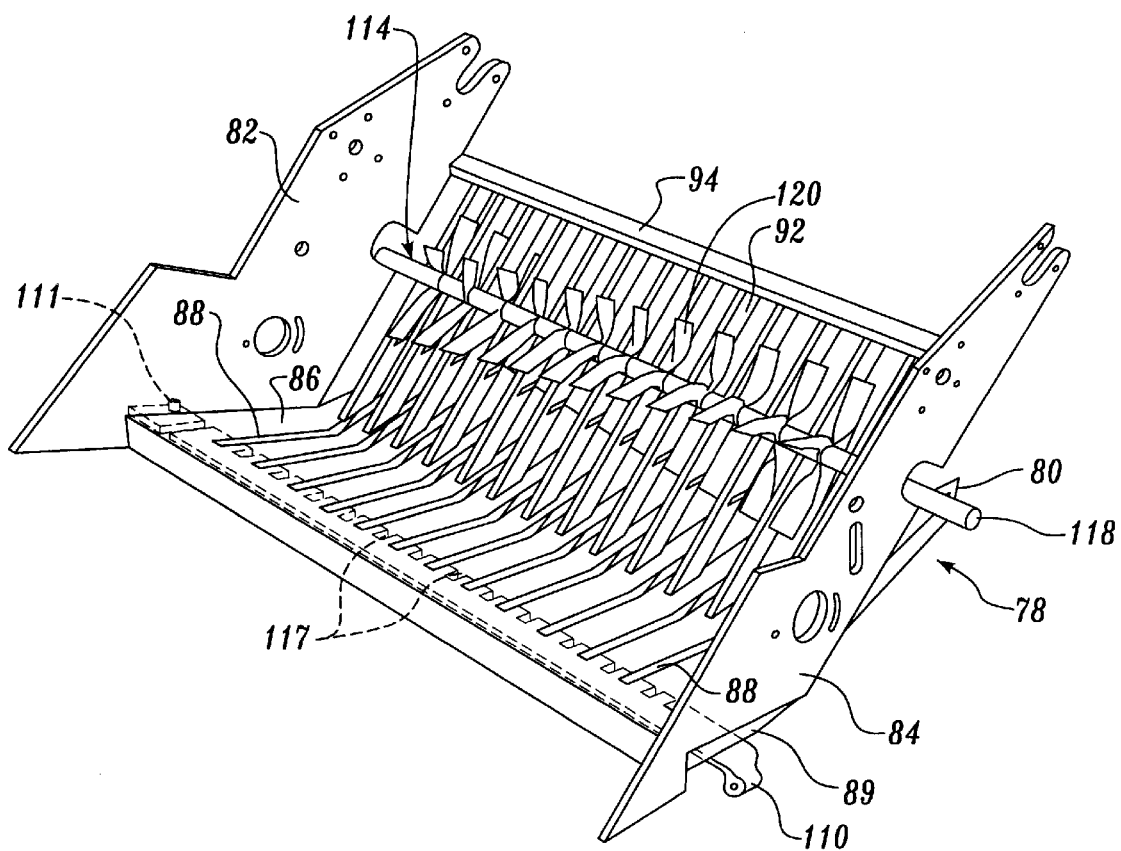
FIG. 6 is a rear perspective view of portions of a harvesting assembly formed in accordance with the present invention.
Figure 7:
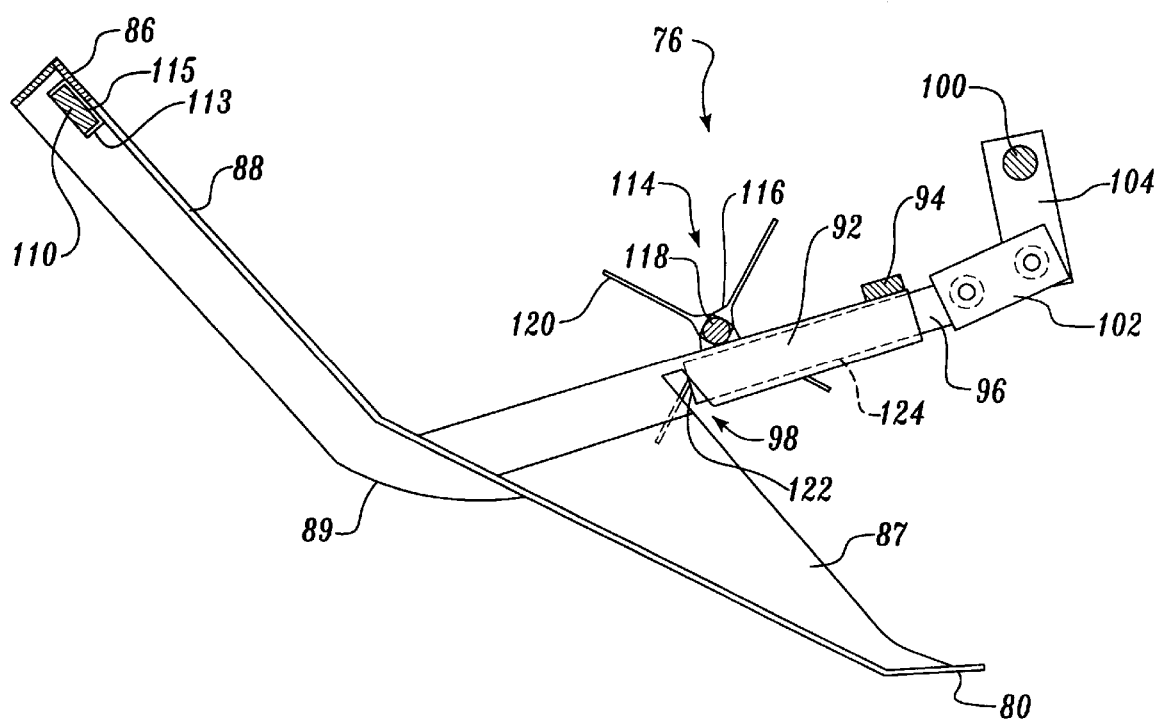
FIG. 7 is a side view of portions of the harvesting assembly of FIG. 6.

Referring to FIGS. 1, 6, and 7, the harvesting assembly 26 includes a head 76 having a berry-picking comb 78 formed from a number spaced-apart teeth 80. The comb 78 is disposed between left and right sidewalls 82, 84 formed as extensions of the left and right side plates 40, 42. The head 76 further includes an upwardly angled rear portion 86 that in is contact with the flat panel. The slots 88 between the teeth 80 extend aftward for substantially the entire length of the rear portion 86 as shown in FIG. 6. The width of the slots 88 should be sufficient to pass the cranberry vine tips through, but narrow enough so that the mature cranberries will be stripped from the tips as the machine 20 is translated forward. The stripped berries are then wiped up the flat panel 46 by the conveyor flaps 66. The teeth 80 are pointed to give the slots 88 a relatively deep V shaped opening. This tends to guide both tips and vines into the comb 78.

It is preferable that the head rear portion 86 be elevated from the forward end of the teeth. It is further preferred that the total length between the forwardmost teeth edge and the aftmost surface of the rear portion be between about 19 to 25-inches long, a preferred length being 21¼-inches. This makes it possible to use the present invention on some of the newer cranberry varieties without destroying the tips, e.g., the Steven variety has longer tips that tend to break with prior art cranberry harvesting machines. The rear portion 86 should also have considerable longitudinal length so that it will act as a downward pressure member and will tend to hold the base of the vines close to the ground and thus allow the fruit bearing tips to protrude above. In order that the teeth will be yieldable but have adequate strength, it is preferred that they be made of relatively thin metal plate and be longitudinally reinforced as by ribs 87. Also shown in FIG. 7, are longitudinal stiffeners 89 that are attached to the underside of the rear portion along each tooth.

In cranberry farming, it is desirable to remove the non-fruit bearing cranberry vines so as to give the tips more growing space and to further make it more convenient to pick the berries when they mature. Typically, the outer ends of the vines tend to grow above the berry-producing tips. Referring to FIGS. 6 and 7, the head 76 preferably includes pruning components including a number of rectangular tubes 92 that are inclined upwardly and forwardly. One tube is provided for each comb tooth 80. A support bar 94 joins the upper ends of the tubes 92. The lower end of the tube is attached to the comb tooth 80 at approximately the longitudinal head location where the rear portion 86 begins its upward slope. Disposed for reciprocation within each tube 92 is a shearing member 96, as best seen in FIG. 7. A cutting slot 98 is formed in the tube 92 to expose the shearing member 96. During use, a vine passing over the teeth 80 will snag at the tube 92 and will be directed downward by the forward angle of the tube. Eventually the vine will reach the cutting slot 98 where it will be cut by the reciprocating shearing member 96.

Referring to FIGS. 2 and 7, the reciprocation of the shearing member 96 is accomplished by a pruning drive shaft 100 that is disposed between the left and right sidewalls 82, 84. Each shearing member 96 extends out the upper opening of its respective tube and rotatably connects with a small link 102. The small link 102 additionally rotatably connects to an arm 104 extending from the pruning drive shaft 100. The pruning drive shaft 100 makes an oscillating motion about its longitudinal axis which causes the arms 104 to oscillate and the links 102 to follow. This, in turn, causes the shearing member 96 to reciprocate within the tube 92. The pruning drive shaft 100 is connected at one end to a dog bone 106 that is in rotational communication with the motor M as described below.

Referring to FIGS. 2, 6 and 7, the other end of the pruning drive shaft 100 is connected to a series of links 108 that ultimately laterally translate a shaker bar 110. The shaker bar 110 is located between the side members 82, 84 at the back of the rear portion 86. Openings 113 formed in the longitudinal stiffeners provide a passage within which the shaker bar 110 is supported. See FIG. 7. The shaker bar 110 is a flat plate having an upper face 115 that is positioned adjacent the underside of the rear portion 86. The shaker bar 110 includes notches 117 located in its forward edge. There is one notch to each slot 88. Prior to use, the notches are aligned with the slots 88. During use, the shaker bar is reciprocated. Any vines that become entangled in the rear portion 84 through the slots 88, will be cut by the shaker bar at the notches 117. The right end of the shaker bar is rotatably connected to the series of links 108. The left end of the shaker bar is preferably extended through the left side member 82, and preferably includes a containment tab 111. The tab is shown in FIGS. 1 and 6. Preferred notches are ¼" wide by ¼" deep. Preferred shaker bar dimensions are 26" long by 1" wide by ⅛" thick.

Referring back to FIGS. 6 and 7, the movement of the vines toward the cutting slot 98 is furthered by a feed bar 114. The feed bar 114 includes a plurality of rotatable picks 116 positioned along a pick shaft 118 that extends between the left and right sidewalls 82, 84. One pick 116 is provided between each shearing member 96. Each pick 116 is formed from a number of flat, rectangularly-shaped pick arms 120 that extend radially from the pick shaft 118. Each arm 120 is twisted approximately 90° so that its flat surfaces do not face to the left or the right. The pick shaft 118 is rotated as described below. The feed bar 114 is positioned such that the picks 116 engage the vines and move them rearwardly. Because the vines are also restricted by the forwardly angled tubes 92, the vines are quickly moved to the cutting slot 98 where they are pruned. The shearing member 96 may cut the vine at a sharp member end edge 122, or on a cutting surface along the member's longitudinal forward edge 124, or both. Once the vine is cut, it is carried upwardly by the conveyor 64. The vine eventually becomes deposited in the container along with the harvested cranberries, where they will be sorted later.

Referring to FIG. 1, the harvesting assembly 26 further includes a gauge wheel 128 for altering the elevation of the head 76 relative to the ground. The gauge wheel 128 is rotationally connected to the left or right sidewalls 82, 84. The gauge wheel 128 is rotationally connected at the left sidewall 82 to one end of a gauge wheel shaft 129 that extends through both the left and right sidewalls 82, 84. Shown in FIG. 2, the other end of the gauge wheel shaft 129 is rotatably connected to a leveling depth handle 130. The handle 130 conveniently concludes near the right side handle bar 48' so that the operator may adjust the head elevation quickly during use.

Referring to FIG. 5, the wheel assembly 24 is preferably formed as a pair of laterally-spaced carriage rolls 132, 132' rotatable about roll shafts 134, 134' that are each rotatably connected to left and right upright side members 136, 138. The upright side members 136, 138 are generally rectangularly shaped. One roll shaft 134 is engaged between the side members' fore ends, and one roll shaft 134' is engaged between the side members' aft ends. Roll shaft sprockets 140, 140' are located on the left end of each carriage roll 132, 132' at a position outboard of the left upright side member 136. The carriage rolls 132, 132' are sized similarly and may be constructed using conventional techniques. The roll shaft sprockets 140, 140' are of smaller diameter than the diameter of the carriage rolls.

A rigid extension 142 is formed along each side member upper edge. A main axial shaft 144 extends between the rigid extensions 142. Connected to the left side outboard end of the main axial shaft 144 is a double-tread main axial shaft sprocket 146. A first endless chain 148 loops between the inboard tread of the main axial shaft sprocket 146 and the forward carriage roll shaft sprocket 140. A second endless chain 150 loops between the outboard tread of the main axial shaft sprocket 146 and the aft carriage roll shaft sprocket 140'.

Referring to FIGS. 3 and 5, left and right main rinks 152, 154 are rotatably engaged with the main axial shaft 144 near its connection to the left and right rigid extensions 142, respectively. The main links 152, 154 are oriented substantially vertically and are secured to the side plates 40, 42 at a location along the main frame lower edge at a longitudinal location corresponding roughly to the machine's center of gravity. The main links 152, 154 provide the mechanism by which the machine 20 may be pivoted fore and aft during use. This is often helpful when maneuvering the machine over bumpy terrain.

Referring to FIGS. 1 and 3, the motor M is mounted to the main frame 22 on a horizontal mounting surface 158 connected to the upper edge of the left side plate 40. The rotational output of the motor M is directed through the drive wheel 30. A short central shaft 160 extends into the left side plate 40 at roughly its planform center. A harvesting assembly drive sprocket 162 is located on the central shaft 160. A triple-grooved idler pulley 164 is also located on the central shaft 160, though, preferably outboard of the harvesting assembly drive sprocket 162. The triple-grooved idler pulley 164 is connected to the harvesting assembly drive sprocket 162 so that rotation of the idler pulley 164 causes like rotation of the sprocket. A first drive belt 166 engages between the inner groove of the idler pulley and the motor drive wheel 30.

Referring to FIG. 1, a third endless chain 168 loops between the harvesting assembly drive sprocket 162 and a pruning sprocket 170 located near the dog bone 106. The pruning sprocket 170 is rotatable about a crank shaft 172 that is connected to the dog bone 106. During use, the motor drive wheel 30 rotates the idler pulley 164 which rotates the harvesting assembly drive sprocket 162 via the short central shaft 160. Rotation of the harvesting assembly drive sprocket 162 causes rotation of the third chain 168, which drives the crank shaft 172. Referring to FIGS. 1 and 2, the crankshaft 172 in turn rotates a small link 173 that is rotatably connected to the aft end of the dog bone 106. Rotation of the crankshaft 172 and small link 173 causes the dog bone to oscillate the pruning shaft 100. Referring to FIG. 2, oscillation of the pruning shaft 100 further causes pivoting of the series of links 108 and eventual reciprocation of the shaker bar 110.

Referring back to FIG. 1, a smaller sprocket 174 is additionally attached to the crank shaft 172. A larger sprocket 175 is connected to the left end of the lower conveyor shaft 72. A fourth endless chain 176 loops between the smaller sprocket 174 and the larger sprocket 175. During use, the motor drive wheel 30 rotates the crank shaft 172 as described above. This further causes the rotation of the lower conveyor shaft 72 and ultimately the translation of the conveyor flaps 66 via the conveyor elevator chains 68 that are in rotational contact with the lower conveyor shaft 72.

Shown in FIGS. 1 and 3, the translational drive assembly 32 stems from the triple-grooved idler pulley 164 to eventually provide power to the wheel assembly 24. The drive assembly 32 starts at second and third drive belts 178, 179 that engage the outer grooves of the triple-grooved idler pulley 164. The second and third drive belts 178, 179 connect between the triple-grooved idler pulley 164 and the left end of a jack shaft 180 that is connected to the left upright side plate 40. The right end of the jack shaft 180 provides the rotational input to the transmission 34 which is located inboard of the right side plate 42. The transmission rotational output is directed through a transmission output shaft 182 that is supported by the right upright side plate 42. Various tensioning sprockets and cylinders are provided as desired by a particular design or designer. For example a tensioning cylinder 184 is shown in FIG. 1 to adjust the tension in the second and third drive belts 178, 179.

Referring back to FIG. 2, the transmission output shaft 182 extends through the right side plate 42 and connects with a pair of gear sets 186, 186' located on the outside of the right side plate. The gear sets 186, 186' each include a larger gear 188, 188' and a pinion gear 190, 190' interconnected via an endless chain 192, 192'. By placing the pinon gears 190, 190' upstream of the larger gears 188, 188' (relative to the output of the transmission shaft 182), the sets 186, 186' increase the available torque. The larger gear 188' of the second set 186' engages the right end of the wheel assembly main axial shaft 144. During use, the motor M drives the triple-grooved idler pulley 164 which drives the jack shaft 180. Rotation of the jack shaft 180 inputs to the transmission 34 which produces an output to the gear sets 186, 186' which drive the wheel assembly 24 via the main axial shaft 144.

The preferred transmission is a hydrostatic transmission having multiple operative modes including forward, reverse, and neutral. The transmission preferably provides variable rotational speeds in one or more of its operative modes. This allows the harvesting assembly 26 and the wheel to both be driven by the motor M, though at potentially different speeds. Therefore, an operator may set the motor M at a speed tailored to the requirements of the harvesting assembly 26, while adjusting the transmission to translate the wheel assembly 24 in a different mode or at a different speed.

Referring to FIGS. 2–4, a shifting lever 194 is connected to the transmission 34 via a transmission shifting arm 196, for shifting between operative modes and speeds. The lever 194 extends to a control panel 198 attached to the right upright side plate 42. In the preferred embodiment, the control panel 198 is an elongated flat metal plate with a bounded slit 200. The lever 194 passes through this slit 200 and is capable of translating along the slit 200. The upper face of the control panel 198 includes markings to indicate where to place the lever 194 in order to set the transmission 34. To keep the lever 194 at a particular slit location, an elongated lever spring 202 (shown in FIGS. 3 and 4) is attached to the underside of the control panel 198. The spring 202 pushes against the lever 194 to urge the lever 194 against opposite slit side. The lever spring 202 should be strong enough to sustain pressure against the lever 194 during operations, but flexible enough that the operator can move the lever 194 to a new location along the slit.

The above description of the distribution of rotational power from the motor M to the various components is provided as a preferred embodiment. The important aspect of the present invention is the bifurcation of rotational power from the motor M between the harvesting assembly 26 and the wheel assembly 24. Also important to the present invention is the addition of a transmission 34 in the path to the wheel assembly 24, downstream of the bifurcation. This arrangement allows the wheel assembly 24 to be operated independently from the harvesting assembly 26, both in mode and speed. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cranberry harvesting apparatus comprising:
   (a) a movable main frame having a forward end;
   (b) a wheel assembly for moving the apparatus, the main frame being supported by the wheel assembly;
   (c) a cranberry harvesting assembly comprising a head having a comb formed from a number spaced-apart teeth and a rear portion, the rear portion being connected to the teeth at an angle oriented upward relative to the teeth, the spaces between the teeth forming slots that extend aftward through substantially the entire length of the rear portion, the comb further including a pruning drive shaft disposed laterally above the teeth, the head being attached to the main frame forward end; and
   (d) a motor having an output shaft drivingly connected to the pruning drive shaft and drivingly connected to the wheel assembly, the connection to the wheel assembly including a transmission having multiple operative modes; whereby the wheel assembly may be operated independently from the harvesting assembly.

2. The cranberry harvesting apparatus according to claim 1, wherein the transmission accepts a rotary input and produces a rotary output; wherein the motor includes a drive wheel and the drive assembly includes a jack shaft rotatably engaged between the drive wheel and the transmission, the jack shaft providing the transmission rotary input; the transmission rotary output being in rotational communication with the wheel assembly via at least one gear set.

3. The cranberry harvesting apparatus according to claim 2, wherein the wheel assembly includes a pair of similarly sized carriage rolls and the at least one gear set is two gear sets.

4. The cranberry harvesting apparatus according to claim 1, wherein the wheel assembly includes a pair of carriage rolls located on the underside of the main frame near the apparatus center of gravity, the carriage rolls being oriented in a generally lateral plane.

5. The cranberry harvesting apparatus according to claim 4, wherein the harvesting assembly includes a gauge wheel attached to the main frame forward end for altering the elevation of the other harvesting assembly components relative to the ground.

6. The cranberry harvesting apparatus according to claim 1, wherein the transmission is a hydrostatic transmission.

7. The cranberry harvesting apparatus according to claim 1, wherein the harvesting assembly may be operated at a constant speed and the wheel assembly may simultaneously be operated at varying speeds.

8. The cranberry harvesting apparatus according to claim 1, wherein at least one of the transmission operative modes may be accomplished at various rotational speeds.

9. The cranberry harvesting apparatus according to claim 1, wherein the harvesting assembly includes a head having a number of spaced-apart teeth extending forwardly from an upwardly inclined rear portion; the harvesting assembly further including a feed bar having a plurality of rotatable picks mounted laterally on a pick shaft, the picks being positioned near the spaces between the teeth.

10. The cranberry harvesting apparatus according to claim 1, wherein the drive assembly further includes a shifting lever connected at one end to a control arm of the transmission, the other end of the shifting lever extending through a slot in a control panel attached to the main frame, the control panel including an elongated compression spring for urging the lever to a particular location along the slot.

11. The cranberry harvesting apparatus according to claim 1, wherein the comb further comprises a shaker bar located transversely across the teeth at the aftmost region of the rear portion, wherein the shaker bar reciprocates longitudinally in order to cut plant portions caught in the slots.

12. A cranberry harvesting apparatus comprising:
 (a) a movable main frame;
 (b) a wheel assembly for moving the apparatus, the main frame being supported by the wheel assembly, the wheel assembly including a pair of laterally-spaced carriage rolls positioned along the underside of the frame, the carriage rolls being of equal diameter, the wheel assembly being located at approximately the center of gravity of the apparatus;
 (c) a harvesting assembly attached to the main frame; and
 (d) a motor for driving the harvesting assembly and for driving the wheel assembly, the motor including a drive wheel, the motor being supported by the main frame and being connected to the wheel assembly via a drive assembly comprising:
  (i) a transmission having multiple operative modes, the transmission accepting a rotary input and producing a rotary output;
  (ii) a jack shaft rotatably engaged between the drive wheel and the transmission, the jack shaft providing the transmission rotary input; and
  (iii) at least one gear set providing rotational communication between the transmission and the wheel assembly; whereby the wheel assembly may be operated independently from the harvesting assembly.

13. The cranberry harvesting apparatus according to claim 12, wherein the harvesting assembly includes a head having a number of spaced-apart teeth extending forwardly from an upwardly inclined rear portion; the harvesting assembly further including a feed bar having a plurality of rotatable picks mounted laterally on a pick shaft, the picks being positioned near the spaces between the teeth.

14. The cranberry harvesting apparatus according to claim 12, wherein the harvesting assembly includes a comb including a number spaced-apart teeth, an upwardly angled rear portion, and a shaker bar located transversely across the teeth at the aftmost region of the rear portion, wherein the shaker bar is adapted to reciprocate longitudinally.

15. The cranberry harvesting apparatus according to claim 12, further comprising a sacking system including a container located at and supported by the main frame, and a conveyor extending between the harvesting assembly and the container.

16. In a cranberry harvesting machine having a motor and a berry-picking comb including a plurality of spaced-apart teeth with slots existing between the teeth, the improvement comprising:
 (a) a planar rear portion connected laterally to the teeth at an angle oriented upward relative to the teeth, the teeth slots extending aftward through substantially the entire length of the rear portion; and
 (b) a shaker bar located transversely across the teeth at the aftmost region of the rear portion, wherein the shaker bar reciprocates longitudinally in order to cut plant portions caught in the slots.

17. The improvement according to claim 16, wherein the cranberry harvesting machine further includes a feed bar having a plurality of rotatable picks mounted laterally on a pick shaft at a position near the spaces between the teeth, the improvement including picks having a longitudinal twist.

18. The improvement according to claim 16, wherein the shaker bar includes a plurality of notches located along its forward edge, whereby during use a plant portion is caught in a notch and is but by a notch edge and an adjacent tooth edge as the shaker bar moves back and forth.

19. The improvement according to claim 16, wherein the cranberry harvesting machine further includes a wheel assembly driven by the motor for moving the cranberry harvesting machine forward through a field or bog, wherein the berry-picking comb includes an oscillating drive shaft driven by the motor, the shaker bar being operably connected to the drive shaft via a series of links, such that at least forward motion of the machine causes oscillation of the drive shaft and reciprocation of the shaker bar.

* * * * *

UNITED STATES PATENT AND TRADEMARK OFFICE
CERTIFICATE OF CORRECTION

PATENT NO. : 5,881,544
DATED : March 16, 1999
INVENTOR(S) : J.M. Furford

It is certified that error appears in the above-identified patent and that said Letters Patent is hereby corrected as shown below:

COLUMN  LINE

10       31     "but" should read --cut--
(Claim 18, line 4)

Signed and Sealed this

Tenth Day of August, 1999

Attest:

Q. TODD DICKINSON

*Attesting Officer*     *Acting Commissioner of Patents and Trademarks*